US006236191B1

(12) United States Patent
Chaffai

(10) Patent No.: US 6,236,191 B1
(45) Date of Patent: May 22, 2001

(54) ZERO VOLTAGE SWITCHING BOOST TOPOLOGY

(75) Inventor: Rachid Chaffai, St. Hubert (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/585,596

(22) Filed: Jun. 2, 2000

(51) Int. Cl.⁷ .................................................. G05F 3/16
(52) U.S. Cl. ......................... 323/225; 323/222; 323/235
(58) Field of Search .................................. 323/222, 225, 323/282, 259, 235

(56) References Cited

U.S. PATENT DOCUMENTS

| | | | |
|---|---|---|---|
| 5,293,111 | 3/1994 | Weinberg | 323/222 |
| 5,414,613 | 5/1995 | Chen | 363/522 |
| 5,486,752 | 1/1996 | Hua et al. | 323/222 |
| 5,543,704 | * 8/1996 | Thoren | 323/222 |
| 5,736,841 | 4/1998 | Gucyski | 323/222 |
| 5,736,842 | 4/1998 | Jovanovic | 323/222 |
| 5,793,190 | 8/1998 | Sahstrom et al. | 3/222 |
| 5,815,386 | 9/1998 | Gordon | 363/50 |
| 5,841,268 | 11/1998 | Mednik | 322/222 |
| 5,914,587 | 6/1999 | Liu | 323/222 |
| 5,923,153 | 7/1999 | Liu | 323/222 |
| 5,959,438 | 9/1999 | Jovanovic | 323/222 |
| 5,977,754 | 11/1999 | Cross | 323/222 |
| 5,991,174 | 11/1999 | Farrington | 363/56 |
| 6,008,630 | 12/1999 | Prasad | 323/222 |
| 6,028,418 | 2/2000 | Javanovic et al. | 323/222 |
| 6,051,961 | 4/2000 | Jang et al. | 323/224 |
| 6,060,867 | * 5/2000 | Farrington et al. | 323/222 |

OTHER PUBLICATIONS

"A Family of PWM Soft–Switching Converters Without Switch Voltage and Current Stresses," Vilela, Coelho, Vieiera, de Freitas; IEEE 0–7803–3–73–0/96, pp. 533–536 (1996), No Month.

* cited by examiner

Primary Examiner—Shawn Riley
(74) Attorney, Agent, or Firm—Coudert Brothers

(57) ABSTRACT

A boost converter topology is disclosed. The boost converter includes a resonant network comprising a saturable element, coupled to three series interconnected resonant diodes. In operation, the first of the three interconnected resonant diodes is a fast recovery type diode such that it stops conducting before the remaining resonant diodes. Due to the fast recovery of the first resonant diode and the configuration of the resonant network, the voltage across the auxiliary control switch of the boost converter does not drop before being turned on, thereby eliminating power losses associated with turning on the control switch.

8 Claims, 3 Drawing Sheets

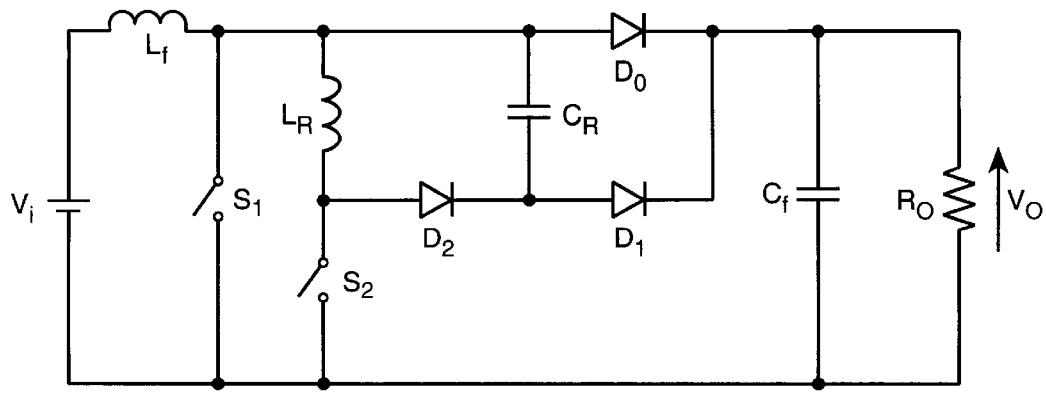
FIG._1
*(PRIOR ART)*
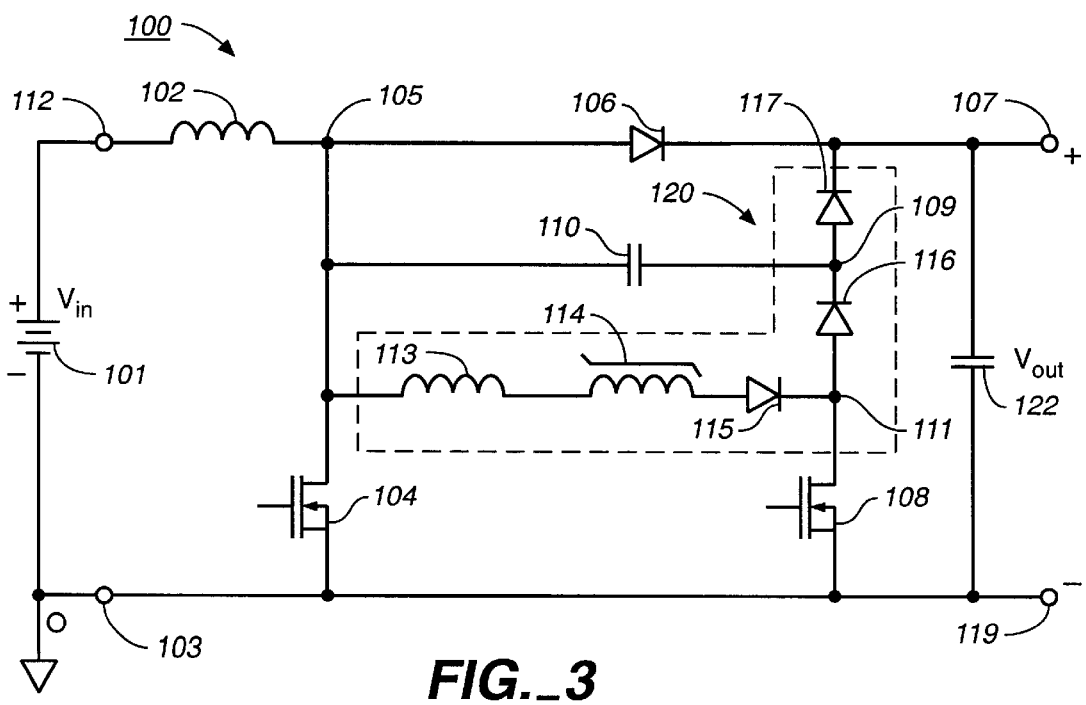
FIG._3

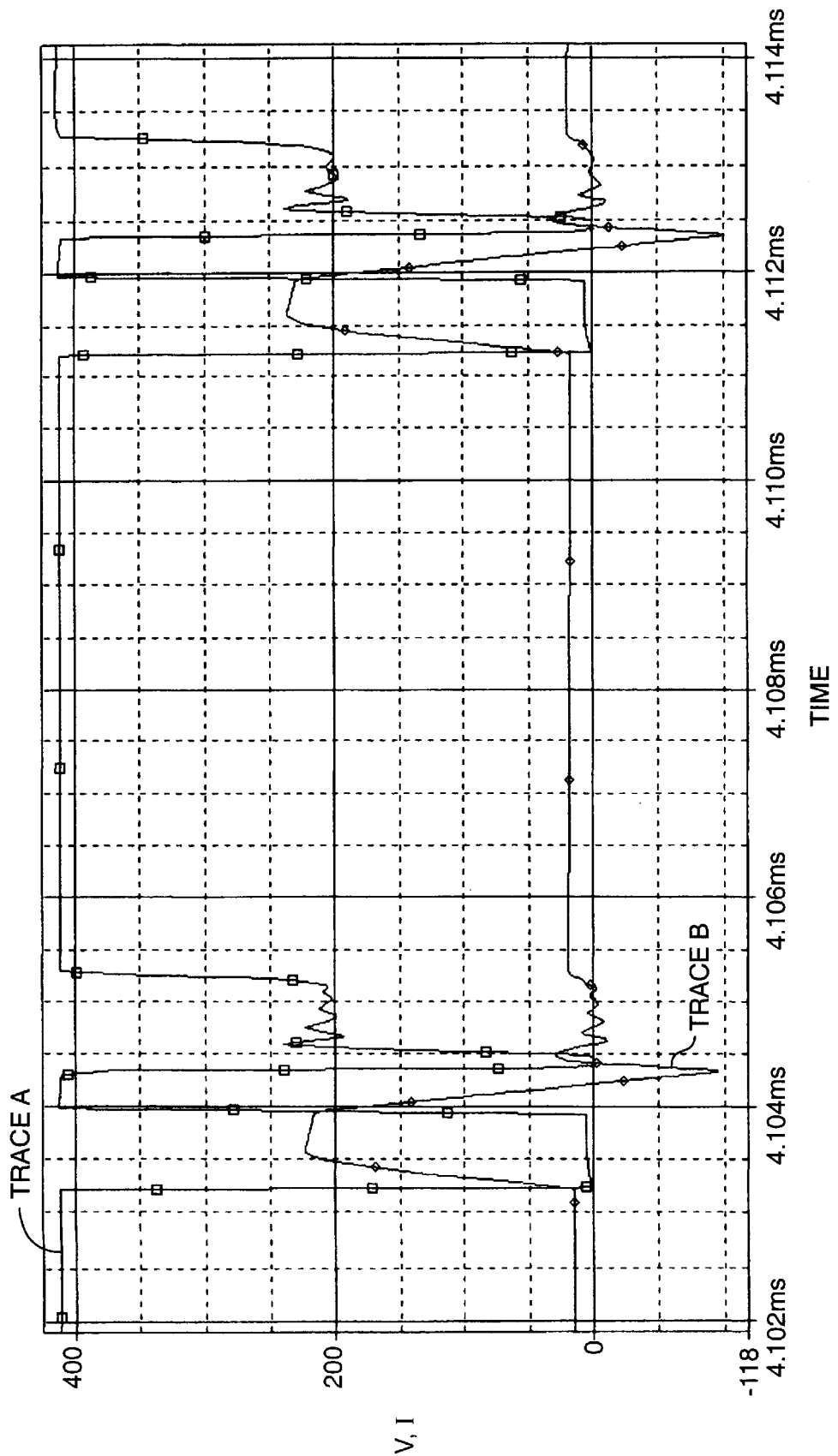
FIG._2 (PRIOR ART)

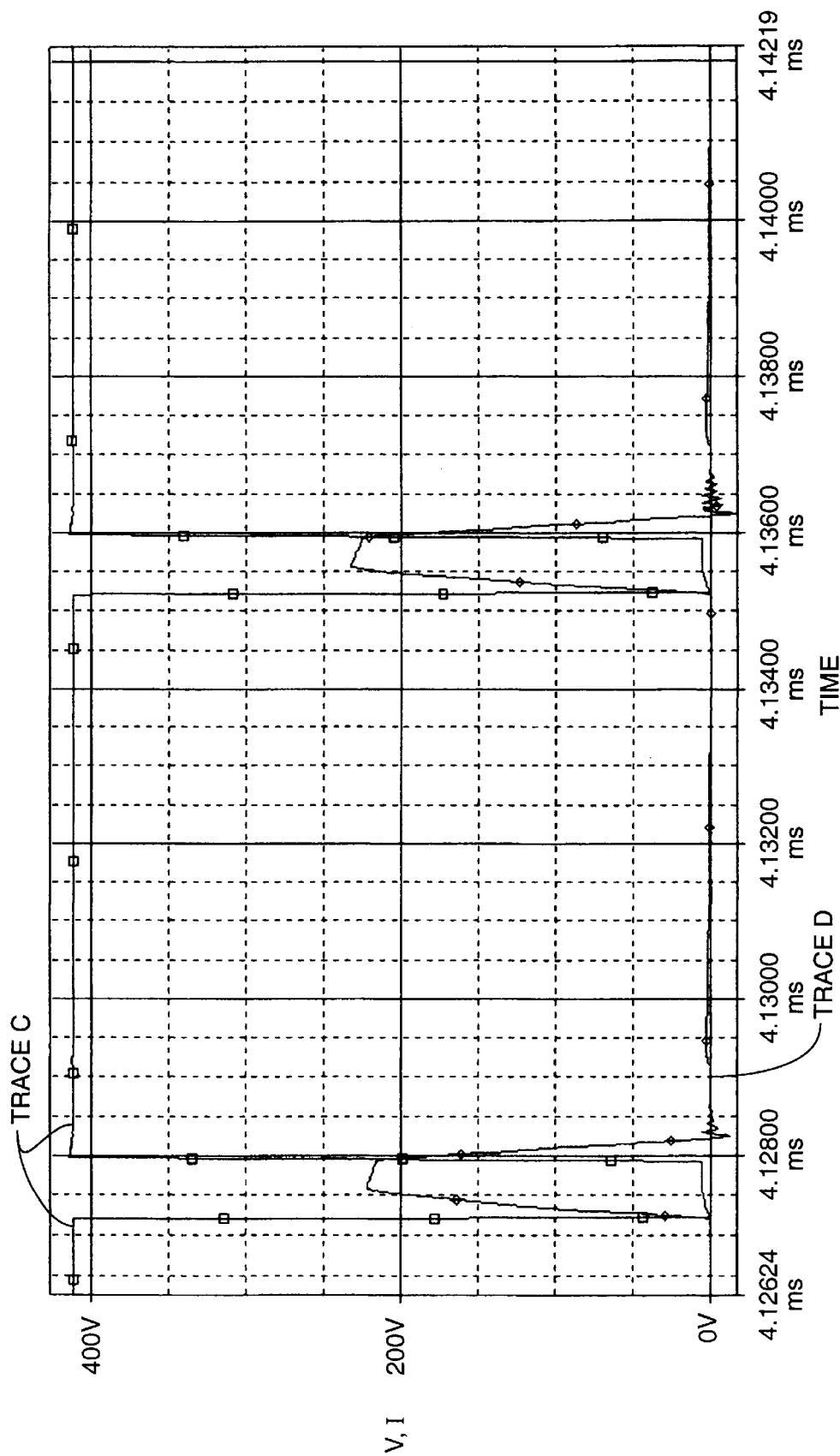
FIG._4

ZERO VOLTAGE SWITCHING BOOST TOPOLOGY

FIELD OF THE INVENTION

The present invention generally relates to DC-DC converters and, more particularly, to an improved circuit topology for boost converters.

BACKGROUND OF THE INVENTION

A boost converter is a type of forward converter where a smaller input DC voltage is increased to a desired level. A typical boost converter includes an inductor to which the input voltage is coupled that is in series with a diode connected to an output capacitor across which the load is connected. A transistor switch is connected to a node between the inductor and diode and ground to provide regulation of the output voltage. The control circuit for the transistor switch includes a comparator for sensing and comparing the output voltage of the converter to a voltage reference to generate an error voltage. This error voltage is then coupled to a duty cycle limited constant frequency pulse width modulator circuit (PWM). The PWM converts the error voltage into a control signal for controlling the timing of the on and off states of the transistor switch. When the transistor switch is on, the inductor current increases, storing energy in its magnetic field. When the transistor is off, energy is transferred via the diode to the load and the output energy storage capacitor. The transistor switch is operated at a high frequency relative to the resonance of the inductor capacitor network.

Drawbacks of such conventional boost converter circuits include the creation of switch voltage and current stresses and thus low efficiency power conversion. To overcome this drawback, boost converters have been proposed that provide soft switching, i.e., switching at low voltage and current stress across the transistor switch. A prior art boost topology for this type of converter is shown in FIG. 1.

As shown in FIG. 1, an input voltage $V_1$ is converted into output power ($V_O$) using a resonant network in addition to the conventional components of a boost converter. The resonant network comprises a resonant inductor $L_R$, coupled in series with resonant diodes $D_1$ and $D_2$. An auxiliary switch S2 and resonant inductor $L_R$ are in series and are connected in parallel with main switch S1. A resonant capacitor $C_R$ connects the anode of resonant diode $D_1$ to the anode of rectifier diode $D_O$. In operation, control switches S1 and S2, are switched with complementary duty cycles, i.e., when one switch is on, the other is off. The current and voltage characteristics of auxiliary switch S2 and the resonant network of this topology are illustrated in FIG. 2.

A drawback exhibited by the boost topology of FIG. 1 is that, after the resonant inductor $L_R$ has reset, the voltage across auxiliary switch S2 drops from a higher voltage level (of approximately 400V) to a lower voltage level (of approximately 200V). The voltage drop across auxiliary switch S2 is illustrated by Trace A of FIG. 2. This voltage drop causes a current to flow in the resonant diodes $D_1$ and $D_2$ prior to auxiliary switch S2 turning on. The current flow through the resonant diodes is illustrated by Trace B of FIG. 2. The voltage drop across auxiliary switch S2, coupled with the resonant diodes conducting current before the auxiliary switch S2 turns on, results in a large amount of stress being placed on auxiliary switch S2 and associated power losses associated with the turning on of auxiliary switch S2. Increased EMI noise also results. The power lost through the auxiliary switch reduces the efficiency of the boost converter.

SUMMARY OF THE INVENTION

The aforementioned and related drawbacks associated with prior art boost converters are substantially reduced or eliminated by the improved boost converter topology of the present invention. In a preferred embodiment of the present invention, the boost converter comprises an inductor coupled in series with a voltage source; a control switch coupled in parallel with the inductor and voltage source for controlling the application of voltage to a load as a function of the frequency and on and off time of the control switch, the control switch having a source, drain and gate; a diode rectifier whose anode is coupled to a first node between the control switch and the inductor and whose cathode is coupled to one of two output terminals of the boost converter for providing the voltage to a load connected thereto; an auxiliary switch, the auxiliary switch having a source, drain and gate and a duty cycle complementary to the duty cycle of the control switch; a resonant network coupled in parallel with the diode rectifier, the resonant network including an inductor, a saturable element, a first resonant diode, a second resonant diode, and a third resonant diode, and a capacitor connected between said first node and a second node between the second and third resonant diodes; and a capacitor coupled across the output terminals of the boost converter. The auxiliary switch is connected between a third node between the first and second resonant diodes and the negative terminal of said voltage source.

In a preferred embodiment of the present invention, the first resonant diode is an ultra-fast and soft recovery type diode, while the second and third resonant diodes are snap-off recovery type diodes. As such, the first resonant diode stops conducting current before the second and third resonant diodes; thereby providing that the voltage across the auxiliary switch does not drop due to the recovery current of the second and third resonant diodes. The improved topology of the present invention thus allows for the control switches to be turned on without exhibiting the level of power losses experienced by prior art boost converters.

An advantage of the present invention is that it provides the ability to turn on the control switches of a power converter without producing significant power losses.

Another advantage of the present invention is that it provides for zero voltage switching of the control switches of a power converter.

Yet another advantage of the present invention is that it reduces the amount of stress exhibited with respect to the components of a power converter and the resultant EMI noise.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which:

FIG. 1 is a schematic diagram of a power converter having a conventional boost topology;

FIG. 2 is a graph illustrating the current and voltage characteristics versus time of selected components in the boost converter of FIG. 1;

FIG. 3 is a schematic diagram of a power converter having a boost topology according to the present invention; and FIG. 4 is a graph illustrating the current and voltage characteristics versus time of selected components in the boost converter of FIG. 3.

DETAILED DESCRIPTION OF THE INVENTION

The power converter of the present invention will now be described with respect to FIGS. 3 and 4. FIG. 3 is a schematic diagram of the power converter of the present invention. In a preferred embodiment of the present invention, the converter 100 has a boost topology including a voltage source $V_{IN}$, shown at 101 whose positive terminal 112 is connected to one terminal an inductor 102. The other terminal of inductor 102 is connected to the anode of a diode rectifier 106 at node 105. The cathode of rectifier 106 is connected to an output node 107 of converter 100.

A control switch 104 is connected in parallel with voltage source 101 and inductor 102, i.e., between node 105 and the negative terminal 103 of voltage source 101 (ground). Control switch 104 controls the application of the voltage $V_{IN}$ to a load (not shown) via the rectifier 106 and an output capacitor 122. The output capacitor 122 is connected across the output nodes 107 and 119 of the converter. In a preferred embodiment of the present invention, control switch 104 is an n-channel MOSFET having a source, drain and gate. The switching of the control switch 104 is controlled by application of a suitable waveform to its control gate. The waveform is provided to the gate of the control switch 104 by a signal generator (not shown). In a preferred embodiment, the waveform is provided by a pulse width modulated signal generator. The drain of the control switch 104 is coupled to node 105. The source of the control switch 104 is coupled to negative terminal 103.

A resonant network 120 is coupled in parallel with diode 106 and to the drain terminals of control switch 104, at node 105, and to auxiliary switch 108, at node 111. The resonant network 120 is operative to prevent power losses associated with auxiliary switch 108 by maintaining the voltage level across auxiliary switch 108 at a specified level before auxiliary switch 108 is turned on. In this fashion, auxiliary switch 108 can be turned on with no recovery current or without blocking any diode. Consequently, no power loss results when auxiliary switch 108 is turned on. The resonant network includes a linear inductor 113, a saturable element 114 and a plurality of resonant diodes 115, 116 and 117 connected in series. The cathode of the third resonant diode 117 is coupled to node 107. A resonant capacitor 110 is connected between node 105 and a node 109. Node 109 is located at the junction between the second resonant diode 116 and the third resonant diode 117.

An auxiliary control switch 108 is coupled between a node 111 and the negative terminal 103 of voltage source 101. In a preferred embodiment of the present invention, the auxiliary control switch 108 is an n-channel MOSFET having a source, drain and gate. Auxiliary switch 108 is switched on and off opposite to control switch 104, i.e., it has a complementary duty cycle as compared to the duty cycle of the switch 104. In operation, auxiliary switch 108 acts with capacitor 110, inductor 113, saturable element 114 and diodes 115, 116 and 117 to provide a snubber circuit for the boost topology of inductor 102, diode 106 and control switch 104.

More specifically, the linear inductor 113 has a first terminal coupled to the drain of the control switch 104 at node 105. The second terminal of the linear inductor is coupled to a first terminal of the mag-amp 114. The second terminal of the mag-amp 114 is connected to the anode of the first resonant diode 115. The cathode of the first resonant diode 115 is connected to the anode of the second resonant diode 116. The cathode of the second resonant diode 116 is connected to the anode of the third resonant diode 117 at node 109. The cathode of the third resonant diode 117 is connected to node 107. The drain of auxiliary switch 108 is connected to the cathode of the first resonant diode 115 at node 111.

In a preferred embodiment of the present invention, the first resonant diode 115 is an ultra-fast and soft recovery type diode. The second resonant diode 116 and the third resonant diode 117 are snap-off recovery type diodes. Also, the saturable element 114 is a mag-amp (or bead). The mag-amp 114 prevents any voltage ringing caused by the resonant capacitor 110 from effecting auxiliary switch 108 by isolating the resonant capacitor 110 from the auxiliary switch 108. In this fashion, the voltage across auxiliary switch 108 remains stable during operation of the boost converter 100. In a preferred embodiment, the resonant capacitor 110 has a value of 2 nF and the linear inductor 113 has a value of 10 $\mu$H. The operation of the resonant network 120 in the context of a boost converter and the advantages resulting therefrom will now be described with respect to FIG. 4.

FIG. 4 is a graph illustrating the current and voltage characteristics of auxiliary switch 108 of the boost converter illustrated in FIG. 3. The boost converter has six stages of operation. The first stage starts with control switch 104 and auxiliary switch 108 being turned off. With the switches in this state, $V_{IN}$ is provided directly to the rectifier 106 making rectifier 106 forward biased. As control switch 104 is turned off, all current is passed through forward rectifier 106,. Thus, the voltage across the resonant capacitor 110 is zero and no current is initially flowing through the series interconnected resonant diodes 115–117.

After a predetermined amount of time has elapsed, the second stage is entered. The second stage is initiated by auxiliary switch 108 being turned on. After switch 108 is on, current initially flowing through rectifier 106 begins to flow through the path defined by linear inductor 113, map-amp 114, the first resonant diode 115, and auxiliary switch 108. The mag-amp 114 saturates rapidly and has a rising current slope that is limited by the linear inductor 113. During the second stage of operation, the current flowing in this loop obtains a value equal to the current flowing through inductor 102 plus the maximum recovery current of the first resonant diode 115.

During the third stage of operation, as a result of the current flowing through the current loop defined by forward inductor 102, linear inductor 113, the saturated mag-amp 114 and the drain-to-source capacitance of control switch 104, the parasitic capacitor of the control switch 104 is discharged. The causes the intrinsic diode of the control switch 104 to turn on. With the auxiliary switch 108 pulling the current to ground, the resonant network 120 provides that the control switch turns on under zero voltage conditions.

During the fourth stage of operation, control switch 104 turns on and, correspondingly, auxiliary switch 108 turns off. This causes a current to flow through the second resonant diode 116. In this stage of operation, the equivalent circuit is a combination of the input voltage source 101, inductor 102, and the control switch 104 connected in parallel with a resonant circuit formed by the drain-to-source capacitance of the auxiliary switch 108, the second resonant diode 116, the resonant capacitor 110 and the linear inductor 113 and the saturated mag-amp 114. With this equivalent configuration, when auxiliary switch 108 turns off, the voltage across the auxiliary switch 108 is controlled by the resonant capacitor 110. At the end of the fourth stage, the voltage across the resonant capacitor 110 and the drain-to-source capacitance of the auxiliary switch 108 is $V_{108}$. The voltage across the resonant capacitor 110 controls the voltage across the auxiliary switch 108 when the switch 108 is off. Consequently, the voltage across the auxiliary switch 108 maintains a value as illustrated by Trace C in FIG. 4. This is in contrast to conventional boost topologies where the voltage across the corresponding auxiliary switch drops significantly as illustrated in FIG. 2 (Trace A). By maintaining the level of voltage across auxiliary switch 108, voltage stresses caused by the turning on/off of the auxiliary switch are substantially reduced.

During the fifth stage of operation, the third resonant diode 117 starts conducting the current that is flowing through the second resonant diode 116. The residual energy stored in the linear inductor 113 is transferred to the load (not shown), thereby decreasing the current flowing through the linear inductor 113. At the end of the fifth stage, the current flowing through this inductor dissipates to zero. As the first resonant diode 115 is an ultra-fast recovery type diode, it recovers the stored charge that is dissipated by the linear inductor 113 and stops conducting the corresponding current before the second and third resonant diodes 116,117 recover their stored charges. In this fashion, the current flowing through the first resonant diode 115 and into auxiliary switch 108 when it turns on during its next cycle is substantially eliminated, as illustrated in Trace D of FIG. 4. As a result, power losses associated with the auxiliary switch 108 turning on are substantially eliminated, as well as EMI noise reduced. This is in contrast to conventional boost topologies where power loss occurs when the auxiliary switch is turned on as illustrated by the overlap of the current flowing through resonant diode D2 (Trace B) and the voltage across auxiliary switch S2 (Trace A) illustrated in FIG. 2. Comparison of the waveforms of FIG. 2 with the waveforms of FIG. 4 illustrates that the voltage across auxiliary switch 108 of the present topology does not drop in value as occurs in the prior art boost topology, therefore no power loss occurs when the auxiliary switch 108 turns on during the next cycle.

During the sixth stage of operation, the resonant network is comprised of the linear inductor 113, the saturated mag-amp 114, the drain-to-source capacitance of the auxiliary switch 108, the parasitic capacitance of resonant diodes 116 and 117 and the resonant capacitor 110, with the drain-to-source capacitance of the auxiliary switch 108, the parasitic capacitance of resonant diodes 116 and 117 and the resonant capacitor 110 being in a parallel configuration. Their equivalent capacitance $C_{EQUIV1}$, is in series with the parasitic capacitance of the first resonant diode 115. This results in a new equivalent capacitance in a new equivalent capacitance $C_{EQUIC2}$, in combination with the linear inductor 113 and the mag-amp 114. Since $C_{EQUIV2}$ is large relative to the parasitic capacitance of the auxiliary switch 108 is low. At the end of the sixth stage, the equivalent circuit is defined by the loop comprising the input voltage source 101 and the forward inductor 102.

In summary, the boost topology 100 according to the present invention allows control transistor 104 to turn-on at zero voltage (ZVS). This topology 100 also allows the auxiliary switch 108 to turn-on without blocking any diode (no recovery current). It also allows the control of the dV/dt of all the transistors when they turn-off. The energy stored in capacitor 110 is transferred to the load (energy recovery). Finally, the topology 100 insured the clamping to the output voltage for transistors 104 and 108.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment disclosed, and that various changes and modifications to the invention are possible in light of the above teaching. Accordingly, the scope of the present invention is to be defined by the claims appended hereto.

What is claimed is:

1. A power converter having input terminals for connection to a power source, comprising:

an inductor connected to a first one of said input terminals;

a diode connected in series communication with said inductor, said diode having a cathode connected to a first output terminal;

an output capacitor coupled across said first output terminal and a second output terminal;

a control switch, coupled between the junction of said series connected inductor and diode and a second of said input terminals, for controlling the application of voltage to said output terminals as a function of the duty cycle of said switch;

a resonant network, coupled between the junction of said series connected inductor and diode and said first output terminal, said resonant network including a saturable element, a first resonant diode, a second resonant diode and a third resonant diode, wherein said saturable element is connected to the anode of said first resonant diode and said first, second and third resonant diodes are connected in series;

a resonant capacitor coupled between the junction of said series connected inductor and diode and the junction of said second and third resonant diodes; and an auxiliary switch, connected between the junction of said first and second resonant diodes and said second output terminal, said auxiliary switch having a duty cycle complementary to the duty cycle of said control switch.

2. The converter of claim 1, wherein said resonant network includes a linear inductor coupled between the junction of said series connected inductor and diode and said saturable element.

3. The converter of claim 1, wherein said first resonant diode has an anode and a cathode, said anode connected to said saturable element and said cathode connected to the anode of said second resonant diode, the cathode of said second resonant diode being connected to the anode of said third resonant diode, the cathode of said third resonant diode being coupled to a terminal of said diode.

4. The converter of claim 3, wherein the said auxiliary switch is a metal oxide semiconductor field effect transistor having a source, drain and gate, the drain of said auxiliary switch being coupled between the cathode of said first resonant diode and the anode of said second resonant diode.

5. The converter of claim 3, wherein said saturable element is a mag-amp and said first resonant diode is a fast recovery type diode.

6. The converter of claim 3, wherein said second and third resonant diodes are snap-off recovery diodes.

7. The converter of claim 1, wherein said control switch is a metal oxide semiconductor field effect transistor having a source, drain and gate.

8. The converter of claim 7, wherein the duty cycle of said control switch is controlled by a feedback control means for enabling the voltage applied to said output terminals to be regulated at a predetermined level, said feedback control means including means for generating a pulse width modulated signal of constant frequency, said signal coupled to the gate of said control switch.

* * * * *